US00RE34301E

United States Patent [19]

Brooks

[11] E Patent Number: Re. 34,301

[45] Reissued Date of Patent: Jul. 6, 1993

[54] FLUID OPERABLE ENGINE

[75] Inventor: David A. Brooks, Magaliesberg, South Africa

[73] Assignee: Garmar, Inc.

[21] Appl. No.: 756,629

[22] Filed: Sep. 9, 1991

Related U.S. Patent Documents

Reissue of:

[64] Patent No.: 4,949,622
Issued: Aug. 21, 1990
Appl. No.: 280,232
Filed: Dec. 5, 1988

[30] Foreign Application Priority Data

Dec. 3, 1987 [ZA] South Africa ..... 87/9089

[51] Int. Cl.[5] ..... F01L 15/12

[52] U.S. Cl. ..... 91/224; 91/229; 91/281; 91/307; 91/308; 91/312; 91/317; 91/318; 92/110; 92/181 R; 92/248

[58] Field of Search ..... 92/110, 181 R, 181 P, 92/183; 91/222, 224, 422, 229, 281, 304, 307, 308, 312, 317, 318

[56] References Cited

U.S. PATENT DOCUMENTS

| | | | |
|---|---|---|---|
| 2,545,506 | 3/1951 | Walsh | 91/229 |
| 2,727,467 | 12/1955 | Russell | 91/224 |
| 2,780,171 | 2/1957 | Heddy | 91/318 |
| 2,862,478 | 12/1958 | Staats | 91/229 |
| 3,390,616 | 7/1968 | Hammer | 91/224 |
| 3,937,241 | 2/1976 | Cloup | 91/229 |
| 3,960,058 | 6/1976 | Berkelius | 91/229 |
| 4,127,057 | 11/1978 | Stubenruss | 91/224 |
| 4,258,609 | 3/1981 | Conway | 92/110 |
| 4,807,321 | 2/1989 | Grasseli | 91/224 |

FOREIGN PATENT DOCUMENTS

| | | | |
|---|---|---|---|
| 118621 | 1/1900 | Fed. Rep. of Germany . | |
| 289758 | 1/1916 | Fed. Rep. of Germany | 91/229 |
| 879338 | 7/1949 | Fed. Rep. of Germany | 91/229 |
| 10284 | 3/1956 | Fed. Rep. of Germany | 91/229 |
| 2532712 | 2/1976 | Fed. Rep. of Germany | 9/318 |
| 2508568 | 12/1982 | France . | |
| 1000617 | 3/1983 | U.S.S.R. | 91/235 |
| 20674 | of 1911 | United Kingdom . | |
| 1348800 | 8/1920 | United Kingdom . | |
| 1144268 | 3/1969 | United Kingdom . | |

*Primary Examiner*—Thomas E. Denion
*Attorney, Agent, or Firm*—Kelly Bauersfeld & Lowry

[57] ABSTRACT

A fluid operable engine has a cylinder in which a piston slides up and down. The cylinder has a cylinder wall and two end walls. The piston divides the cylinder into two chambers. The piston is hollow, has a cylindrical wall and two end walls, with a rigid tube extending from and through one end wall of the piston through an adjacent end wall of the cylinder so that the interior of the piston communicates with the exterior through the tube. The cylinder has an aperture in each end wall or in its cylindrical wall close to the end walls and the piston has an opening in each of its end walls. A closure member is provided for alternately closing the openings or the apertures as the piston reaches each end wall. The engine is operated either in a positive or negative manner, with fluid being charged into or sucked from the piston or the cylinder. The openings may be closed from within or without and the apertures may be closed from inside or outside. The closure member may be mechanically or fluid operable. Either the apertures are bigger than the openings or vice-versa.

20 Claims, 3 Drawing Sheets

FLUID OPERABLE ENGINE

Matter enclosed in heavy brackets [ ] appears in the original patent but forms no part of this reissue specification; matter printed in italics indicates the additions made by reissue.

BRIEF SUMMARY OF THE INVENTION

THIS INVENTION relates to a fluid operable engine. More particularly, the engine may be pneumatically or hydraulically operable. Further, the engine is of the type which provides reciprocating motion.

According to the invention, there is provided a fluid operable engine, which includes

- a cylinder defining member which has walls to define a cylinder that is closed at opposed first and second ends,
- a piston that is within the cylinder and is slidable therein, the piston having opposed first and second ends;
- a first set of orifices comprising a first opening defined in the first end of the piston and a second opening defined in the second end of the piston;
- a second set of orifices comprising a first aperture defined in a wall of the cylinder defining member at its first end and a second aperture defined in a wall of the cylinder defining member at its second end, a cyclically operable closure means for alternately closing the orifices of a selected one of the sets of orifices;

- a communication means for establishing fluid communication through the piston between the exterior of the cylinder and the first and second openings; and a force and movement transferring means for transferring forces exerted on the piston and movement thereof relative to the cylinder defining member to the exterior of the cylinder.

The cylinder defining member may have first and second cylinder end walls and the apertures may be in these end walls. The cylinder defining member may also have a cylindrical wall and the apertures may be in this wall close to its ends. The piston may similarly have end walls in which the openings are defined.

It will be appreciated that the engine may be operated in either a positive supply or a negative supply manner. Thus, in a positive supply manner, the engine may be supplied with a fluid that is at a pressure greater than ambient, and in a negative supply manner, the engine may be connected to a suction device which causes the pressure to be less than ambient. Further, if either a positive or a negative supply device is used to drive the engine, it can be connected to either the exterior of the cylinder defining means or to the communication means.

It will further be appreciated that the piston divides the cylinder into a first and a second chamber. Conveniently, the first end walls of the cylinder defining member and the piston may be adjacent one another so that the first chamber is between these walls, with the second chamber being between the second end walls. It will then be understood that the engine operates by creating a cyclic pressure differential between the two chambers which causes the piston to move back-and-forth in the cylinder.

The communication means may include a tube which extends from the second end wall of the piston through the second end wall of the cylinder defining member, to be slidable therethrough, in a relatively fluid tight manner. A seal may be provided between the tube and the second end wall of the cylinder defining member. The piston may be hollow to define an interior chamber which communicates with the interior of the tube and the openings. Instead, the piston may have suitable passages extending between the tube and the openings.

The force and movement transferring means may be a rigid element which is fast with and extends from the second end wall of the piston through the second end wall of the cylinder defining member to be slidable therein in a relatively fluid tight manner. Conveniently, the tube may be sufficiently strong and rigid to perform this function.

In a preferred form either the openings will be smaller than the apertures or vise-versa depending on whether the engine is being operated in a positive or negative supply manner, and whether the source of power is connected to the outside of the cylinder defining member or to the communication means.

Similarly, the closure means may close the openings from inside the piston or from outside; or close the apertures from within the cylinder or from without.

Further in regard to the closure means it may comprise one closure member or two. The, or each, closure member may be displaced into and out of closing engagement with an opening or aperture by fluid forces, by a mechanical arrangement or in any other suitable manner.

A side seal may be provided between the piston and cylinder cylindrical walls. An end seal may also be provided between the first piston and cylinder end walls and between the second piston and cylinder end walls. These seals may be flexible and frusto-conical so that a closed space is formed which decreases in volume, as the piston approaches each end of the cylinder, which communicates with the appropriate opening.

BRIEF DESCRIPTION OF THE DRAWINGS

The invention is now described, by way of examples, with reference to the accompanying drawings, in which.

DETAILED DESCRIPTION

Figure 1:
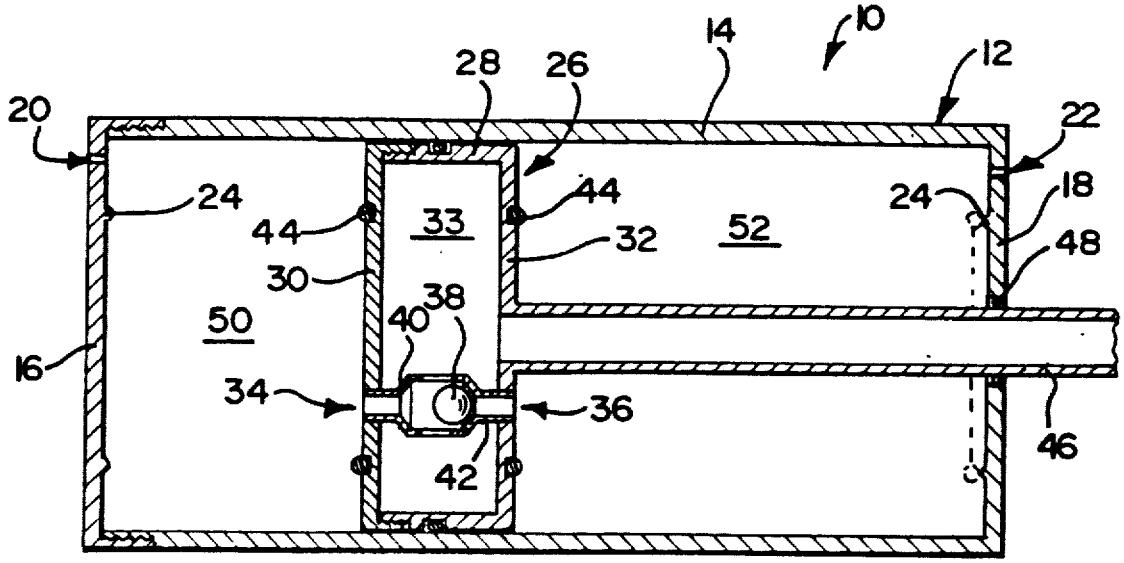
FIG. 1 shows a schematic view of a first embodiment of an engine in accordance with the invention, that operates in a positive supply manner.

Referring to FIG. 1, a fluid operable engine in accordance with the invention is designated generally by reference numeral 10. The engine 10 has a cylinder defining member 12 which has a circular cylindrical wall 14, a first end wall 16 and a second end wall 18. A first aperture 20 is defined in the end wall 16 and a second aperture 22 is defined in the second end wall 18.

Both the first end wall 16 and the second end wall 18 have a central, circular, inwardly projecting ridge 24. The cylindrical wall 14 and the end walls 16 and 18 define a cylinder.

A hollow piston 26 is located within the cylinder and is slidable therein. The piston 26 also comprises a cylindrical wall 28 and first and second end walls 30 and 32 to define an interior chamber 33. A first opening 34 is defined in the end wall 30 and a second opening 36 is defined in the end wall 32. A ball 38 is within the piston and it closes either the opening 34 or the opening 36, seats 40 and 42 being provided to promote sealing. "0"-ring seals 44, which are the same size as the ridges 24, are mounted on the outer surfaces of the end walls 30 and 32, in alignment with the ridges 24, to be engageable therewith. It will be noted that the openings 34 and 36 are surrounded by the seals 44. It will further be noted that the apertures 20 and 22 are substantially smaller than the openings 34 and 36.

Finally, the engine 10 has a rigid tube 46 which is fast at one end with the end wall 32, so that the interior of the tube 46 is in communication with the interior chamber 33 of the piston 26 and is slidable therewith. The tube 46 passes through a hole in the end wall 22 with a seal 48 being provided.

It will be appreciated that the piston 26 divides the interior of the cylinder into two variable volume chambers 50 and 52.

In use, water under pressure is supplied to the engine 10 from a suitable source, which is connected to the free end of the tube 46. The water flows through the tube 46 into the piston 26 and out through one of the apertures 34 or 36. Those skilled in the art will appreciate that the ball 38 will close one of the apertures 34 or 36. On the assumption that the ball 38 closes the aperture 36 as shown, water will exit through the aperture 34 into the chamber 50. Some of the water will exit through the opening 20. However, as the opening 20 is substantially smaller than the aperture 34, the pressure of the water in the chamber 50 will be greater than the pressure in the chamber 52 and accordingly the piston 26 will be displaced from left to right. Initially, there will not be any water in the chamber 52 and air therein will be expelled through the aperture 22 as the piston 26 moves from left to right. It will be appreciated that the pressure in the piston 26 will be greater than that in the chamber 52, thereby keeping the ball 38 seated against the seat 42 for the opening 36. After one or two strokes, the chamber 52 will be filled with water and then water will be expelled out of the aperture 22. It will further be appreciated that if the cylinder defining member 12 is kept stationary, the tube 46 will be displaced by the piston 26. The force provided by the tube 46 will depend on the difference in pressure between the chambers 50 and 52 and the operative surface area defined by the end wall 30. It will further be appreciated that if there is not much resistance to movement of the tube 46 that there will be very little difference in pressure between the chambers 50 and 52. However, if movement of the tube 46 relative to the cylinder defining member 12 is resisted, and the piston 26 stops moving, the pressure in the chamber 52 will become equal to ambient pressure, and the pressure in the chamber 50 will increase to almost the maximum pressure provided by the source. Thus, the engine 10 automatically responds to changing conditions, increasing the force required.

Eventually, the end wall 32 will reach the end wall 18 so that the seal 44 engages the ridge 24 of the end wall 18, as shown in dotted lines in FIG. 1. When this occurs, a small chamber will be defined from which fluid cannot escape. Thus, any further movement of the piston 26 towards the end wall 18 will cause pressure in this auxiliary chamber to increase, until the pressure therein is greater than the pressure within the piston 26, causing the ball 38 to be displaced away from the seat 42 of the opening 36. It will be clearly appreciated that because the end wall 30 has a much greater cross-sectional area than the portion of the end wall 32 enclosed by the seal 44, the pressure in the auxiliary chamber that is formed will become greater than the pressure within the piston 26. As there is substantially no flow of water through the opening 36, even though the ball 38 is not closing it, and as there is flow of water out through the other opening 34, the ball 38 will be displaced into sealing engagement with the seat 40 of the opening 34. With the opening 34 closed, further water will then flow through the opening 36 into the chamber 52, causing the piston 26 to be displaced from right to left. The piston 26 will move from right to left until it engages the end wall 16, whereupon the ball 38 will be transferred into closing engagement with the seat 42. The piston 26 will then move from left to right, and the process will be repeated as long as water under pressure is supplied to the tube 46.

Figure 2:
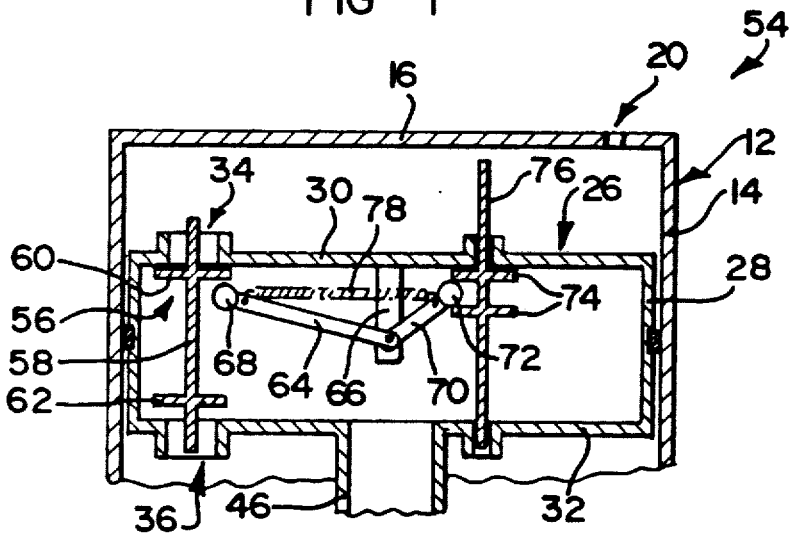
FIG. 2 shows schematically a variation of the closure means of the engine of FIG. 1.

Referring to FIG. 2 of the drawings, a part of a further embodiment 54 of the engine is shown. The embodiment 54 is similar to the embodiment 10 shown in FIG. 1, except that a mechanically operable closure means is provided for closing either the opening 34 or the opening 36. This embodiment 54 is otherwise numbered in a similar manner to the embodiment 10. Thus, this embodiment 54 has a valve member 56 which is located within the piston 26. The valve member 56 has a stem 58 with spaced stoppers 60 and 62. When the stopper 60 is in engagement about the opening 34 to close it, the stopper 62 is spaced from the opening 36 so that fluid can flow therethrough, and vice versa. A first lever arm 64 is pivotally mounted at one end to a post 66 and its other free end 68 is engageable with the stoppers 60 and 62 to displace them into engagement with the end walls 30 and 32 respectively to close the openings 34 and 36 respectively. A second lever arm 70 is also pivotally mounted at one end to the post 66. Its other end 72 is located between two rings 74 that are fast with a plunger 76 that projects through both the end walls 30 and 32. The free ends of the lever arms 64 and 72 are connected by means of a spring 78. With the arrangement as shown in FIG. 2, if the piston 26 is moving towards the end wall 16, ie. the opening 34 is closed and the opening 36 is open, the plunger 76 will engage the end wall 16 and be displaced downwardly, with reference to FIG. 2. This will cause pivoting of the lever arm 70 and, when the spring 78 moves past the pivotal axis of the arms 64 and 70, the arm 64 will be caused to pivot, thereby displacing the valve member 56 so that the opening 36 is closed. The plunger 76 will now project from the end wall 32 so that when the end wall 18 (not shown in FIG. 2) is reached the plunger 76 will be displaced in the opposite direction, causing pivoting of the lever arm 64 back to the position shown in FIG. 2 so that the opening 34 is closed.

Figure 3:
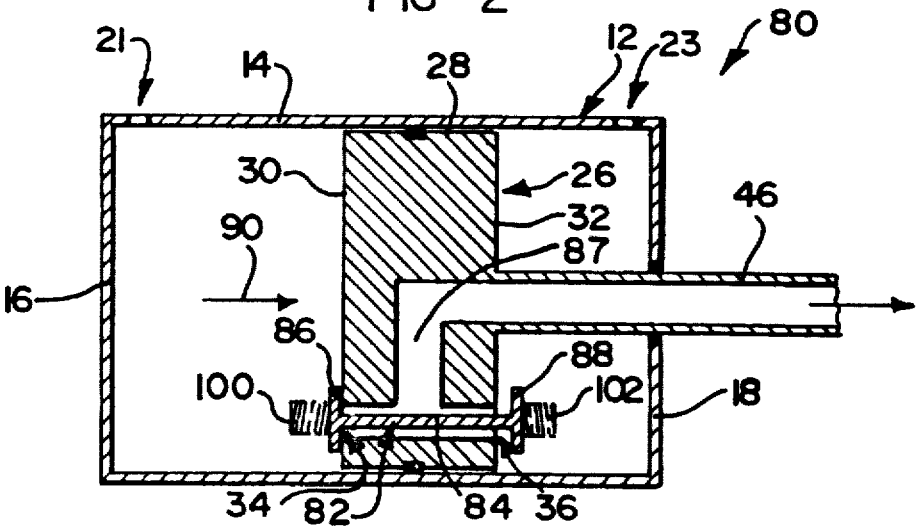
FIG. 3 shows schematically a further embodiment of an engine in accordance with the invention, that operates in a negative supply manner.

Referring now to FIG. 3, a further embodiment of an engine in accordance with the invention is designated generally by the reference numeral 80. This embodiment 80 is similar to the embodiment 10 of FIG. 1 and is similarly referenced. However, this embodiment 80 operates in a negative pressure manner so that it has a valve member 82 with a stem 84 carrying two opposed stoppers 86 and 88 that are outside the piston 26 and the piston has passageways such as passage 87. It will be appreciated, that if the valve member 82 is in the position shown in FIG. 3, and suction is applied to the free end of the tube 46, that the piston 26 will move from left to right as shown by the arrow 90. When the spring 102 reaches the end wall 22 it will begin to compress. Further movement of the end wall 32 will cause the spring 102 to compress further until it has sufficient force to overcome the resisting pressure differential experienced by stopper 86 between the interior of piston 26 and the left-hand chamber defined by piston 26 and cylinder 12. The energy stored in the spring 102 will ensure that the valve member 82 will be fully displaced from right to left, closing the opening 36 and opening the opening 34. Further suction will cause the piston 26 to move from right to left until the end wall 30 reaches the end wall 16, displacing the valve member 82 back to the position shown in FIG. 3. It will be noted that this embodiment 80 has apertures 23 that are at each end of the cylindrical wall 14.

Figure 4:
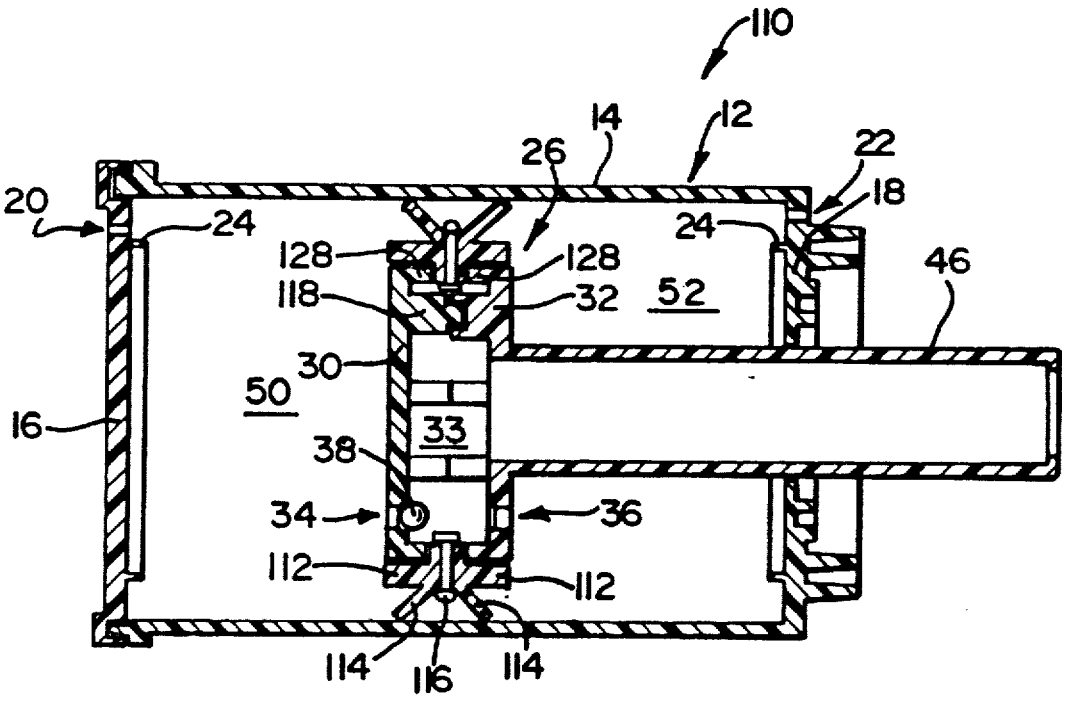
FIG. 4 shows a longitudinally sectioned view of a further embodiment of an engine in accordance with the invention, that is similar to the embodiment of FIG. 1.

Referring to FIG. 4, a further embodiment of an engine in accordance with the invention is designated generally by reference numeral 110. This embodiment 110 is similar to the embodiment 10 shown in FIG. 1 and is similarly referenced. Its operation is also similar to that of the embodiment 10 of FIG. 1. With this embodiment, the piston 26 is formed in two parts that are held together by means of posts 118. This embodiment 110 further has two seals, each having a side sealing portion 114 and an end sealing portion 112 with the end sealing portions 112 engaging the ridges 24 on the end walls 16 and 18. The two parts that form the piston 26 have sidewall portions 128 which do not meet with the seals being received therein and being held in place by a holding ring 116. It will be appreciated that the cylindrical wall of the piston 26 is defined by the sidewalls 128, the seals and the ring 116.

Figure 5:
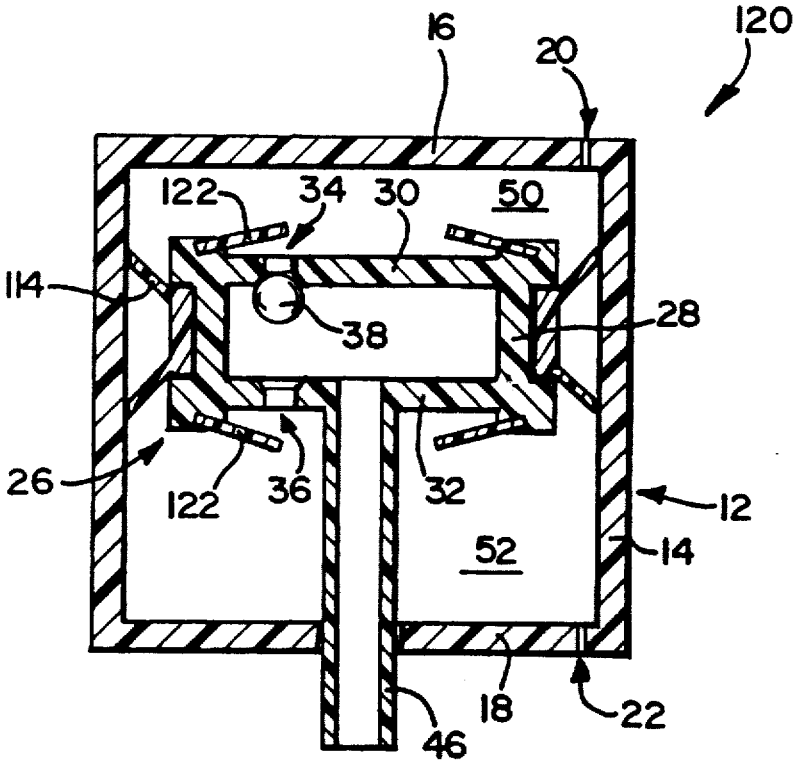
FIG. 5 shows a variation of the engine shown in FIG. 4.

Referring now to FIG. 5, a still further embodiment 120 is shown. This embodiment is also similar to the embodiments 10 and 110 of FIGS. 1 and 4 respectively and is similarly referenced. This embodiment 120 does not have the ridges 24 and instead has two frusto-conical end seals 122. The wider ends of these seals 122 are held in grooves in the end walls 30 and 32. The seals 122 surround the openings 34 and 36. It will be appreciated that as the piston 26 moves into engagement with the end walls 16 and 18 the seals 122 collapse and the auxiliary chambers defined thereby have a fairly large change in volume, as compared with the ridge and seal arrangements shown in FIGS. 1 and 4. Further, as the piston 26 moves closer to either the end wall 16 or 18, pressure of water in the auxiliary chamber defined by the frusto-conical seals 122 forces the seals into sealing engagement with the end wall 16 or 18 (as appropriate) and, the narrower ends of the seals 122 scrape the walls 16, 18 to provide improved sealing as compared with the arrangements in FIGS. 1 and 4.

Figure 6:
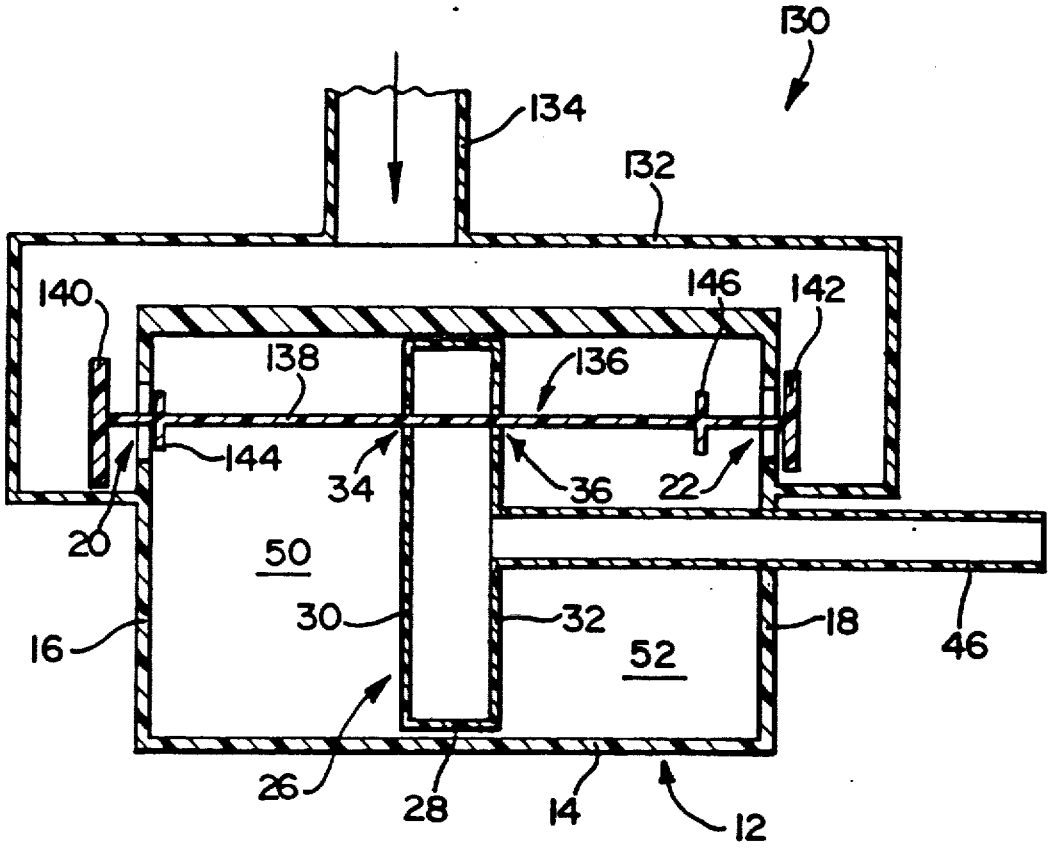
FIG. 6 shows a schematic sectioned view of a still further embodiment of an engine in accordance with the invention.

Referring finally to FIG. 6, a still further embodiment of an engine in accordance with the invention is designated by reference numeral 130. This embodiment 130 is also operated in a positive supply manner. However, water under pressure is supplied to the outside of the cylinder 12, rather than to the inside of the piston 26 via the tube 46. Thus, with this embodiment 130, a casing 132 is provided around a part of the outside of the cylinder defining member 12 so that the apertures 20 and 22 are in communication with a port 134 to which the water under pressure is supplied. The apertures 20 and 22 are closed from outside by means of stoppers 140 and 142 on a valve 136. The valve 136 has a shaft 138 which extends between the stoppers 140 and 142 and passes through the piston 26 via openings 34 and 36 in the end walls 30 and 32 respectively. The valve 136 also has collars 144 and 146 close to the stoppers 140 and 142 respectively which are engaged by the piston 26, to displace the valve 136 back-and-forth. The apertures 20 and 22 are greater than the openings 34 and 36.

With this embodiment 130, if it is assumed that the stopper 142 is closing the aperture 22, water supplied via the port 134 will flow into the chamber 50 via the aperture 20. The valve 136 is such that if one of the stoppers 140, 142 closes its associated aperture 20, 22, the other stopper 142, 140 is spaced away from its associated end wall 18, 16 so that its aperture 22, 20 is open. As the opening 34 is smaller than the aperture 20, pressure will build up in the chamber 50 causing the piston 26 to move to the right. Water in the chamber 52 will bleed through the opening 36. When the piston 26 reaches its limit of travel it engages the collar 146, thereby displacing the valve from left to right, closing the aperture 20 and opening the aperture 22. Water then flows into the chamber 52, displacing the piston 26 from right to left.

If the embodiment 130 is modified to have the stoppers 140 and 142 inside the cylinder, then it can be operated in a negative supply manner, with a suction being supplied to the port 134.

By means of the invention, an engine is provided that is cheap to manufacture, is reliable and compact, and which responds automatically to resistive forces.

I claim:

1. A fluid operable engine, which includes a positionally fixed cylinder defining member which has walls to define a cylinder that is closed at opposed first and second ends;

a piston that is within the positionally fixed cylinder and is slidable therein, the piston having opposed first and second ends;

a first set of orifices comprising a first opening defined in the first end of the piston and second opening defined in the second end of the piston;

a second set of orifices comprising a first aperture defined in a wall of the cylinder defining member at its first end and a second aperture defined in a wall of the cylinder defining member at its second end;

a cyclically operable closure means for alternately closing the orifices of a selected one of the sets of orifices, *characterized in that the other set of orifices has no closure means, and the set of orifices having a closure means is larger than the set without a closure means;* a communication means for establishing fluid communication through the piston between the exterior of the cylinder and the first and second openings; and a force and movement transferring means for transferring forces exerted on the piston and movement of the piston to the exterior of the cylinder.

2. The engine claimed in claim 1 in which the cylinder defining member has first and second cylinder end walls and the first aperture is in the first cylinder end wall and the second aperture is in the second cylinder end wall.

3. The engine claimed in claim 1, in which the cylinder defining member has a cylindrical wall and the first aperture is in the cylindrical wall close to the first end and the second aperture is in the cylindrical wall close to the second end.

4. The engine claimed in claim 1, in which the piston has first and second end walls and the first opening is in the first piston end wall and the second opening in the second piston end wall.

5. The engine claimed in claim 1, in which the openings are larger than the apertures.

6. The engine claimed in claim 1, in which the apertures are larger than the openings.

7. The engine claimed in claim 1, in which the piston is hollow and the communication means includes a tube which extends from the second end of the piston through the second end of the cylinder defining member, to be slidable therethrough in a relatively fluid tight manner.

8. The engine claimed *in* claim 1, in which the force and movement transferring means comprises a rigid element which is fast with and extends from the second end of the piston through the second end of the cylinder defining member to be slidable therethrough in a relatively fluid tight manner.

9. The engine claimed in claim 1, in which the closure means includes one closure component.

10. The engine claimed in claim 1, in which the closure means includes two closure components.

11. The engine claimed in claim 9 or 10, in which the closure means includes a displacing means, operable upon the piston reaching a limit of travel at both ends of the cylinder, for displacing the or each closure component.

12. The engine claimed in claim 11, in which the displacing means is fluid operable.

13. The engine claimed in claim 11, in which the displacing means is mechanically operable.

14. The engine claimed in claim 1, in which the cylinder defining member and the piston each have a cylindrical wall.

15. The engine claimed in claim 14 which includes a side seal means between the cylindrical wall of the piston and the cylindrical wall of the cylinder defining member.

16. The engine claimed in claim 1, in which the piston is hollow to define an interior chamber which communicates with the first and second openings, and which includes a closure member within the interior chamber for closing one and then the other opening in a cyclical manner.

17. The engine claimed in claim 1, which includes a first end seal located between the first end of the piston and the first end of the cylinder and a second end seal located between the second end of the piston and the second end of the cylinder, the first end seal surrounding the first opening and the second end seal surrounding the second opening, for providing a first closed space between the first end of the piston and the first end of the cylinder in communication with the first opening, and a second closed space between the second end of the piston and the second end of the cylinder in communication with the second opening, respectively, when the piston is at its limits of travel.

18. The engine claimed in claim 17, in which the first and second end seals are flexible such that the first and second spaces decrease in volume as the piston moves towards the first and seconds ends of the cylinder respectively.

19. The engine claimed in claim 17 or 18, in which the first and second end seals are frusto-conical.

20. The engine claimed in claim 19, in which the first and second end seals are fast with the first and second ends of the piston, respectively, at their wider ends.

* * * * *